Patented Mar. 20, 1923.

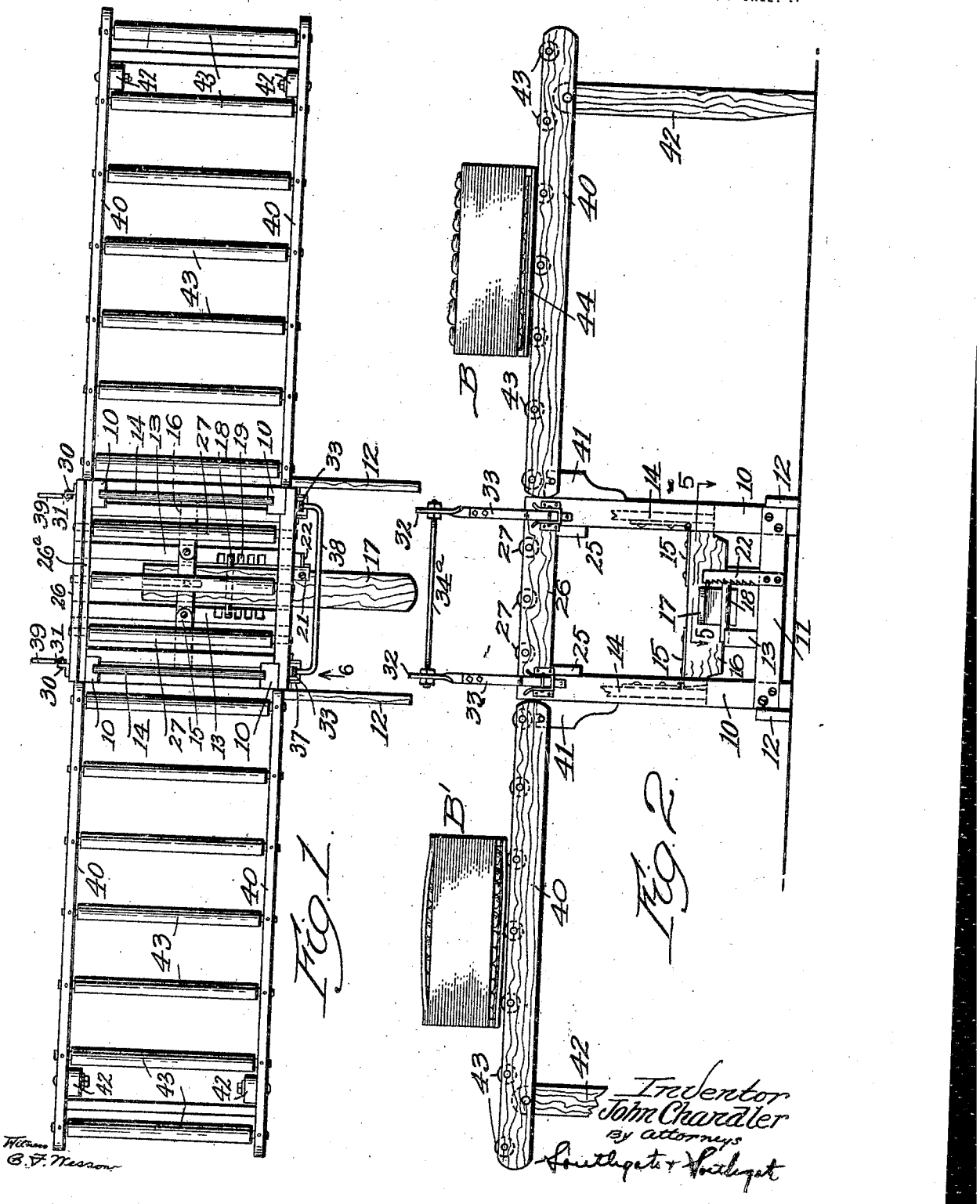

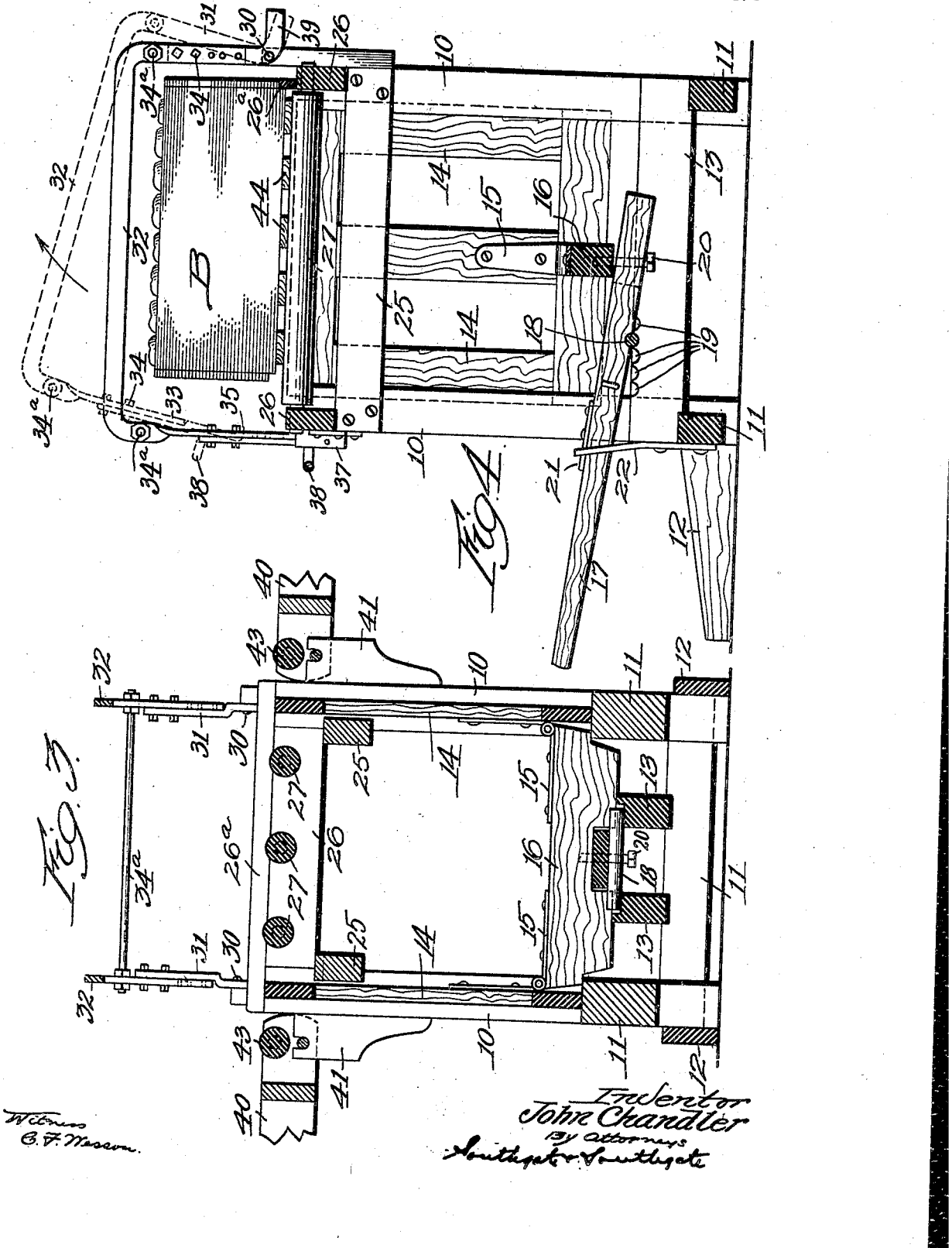

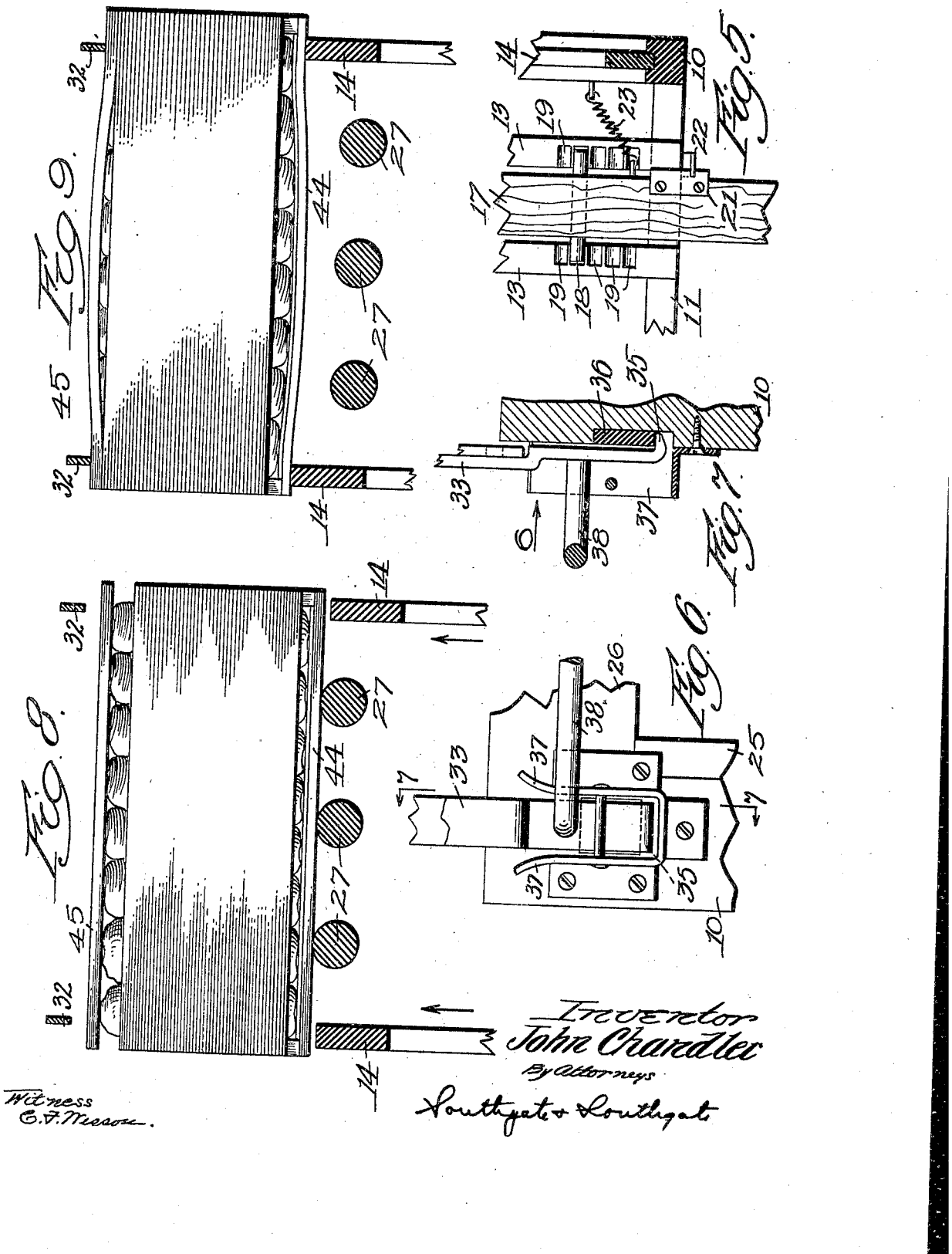

1,448,790

UNITED STATES PATENT OFFICE.

JOHN CHANDLER, OF STERLING, MASSACHUSETTS.

FRUIT-BOX PRESS.

Application filed April 13, 1922. Serial No. 552,153.

*To all whom it may concern:*

Be it known that I, JOHN CHANDLER, a citizen of the United States, residing at Sterling, in the county of Worcester and State of Massachusetts, have invented a new and useful Fruit-Box Press, of which the following is a specification.

This invention relates to a press for use in closing fruit boxes after the boxes have been packed with apples, oranges or other fruit. It is essential that the fruit be firmly held from movement in the box to prevent chafing and bruising thereof during shipment, and for this purpose it is customary to fill each box slightly above its edges and to then force a relatively thin flexible cover down over the fruit, securing its ends to the ends of the box.

Fruit presses have been heretofore built, designed to press down a cover against the edges of a box supporting on a fixed table or frame, and to hold the cover in this position while it is nailed or otherwise secured to the box.

It is the object of my invention to provide a fruit box press which will be operative to raise the box and hold it firmly in elevated position while being closed, instead of forcing the cover or open side down against the box.

It is customary in the use of my improved press, to initially secure a slatted cover to the box and to pack the fruit with the box in inverted position. A flexible bottom is then laid on the box and the inverted box is then raised against the bottom members, allowing the fruit to spring both the cover and bottom outward. The box is held in this raised position while the bottom is secured thereto.

This arrangement possesses important advantages and in particular permits conveying rolls or other conveying devices to be used with the machine, so that the boxes may be moved toward and from the press without the necessity for lifting or handling the heavy boxes of fruit. This greatly reduces the manual labor involved in the boxing operation and is a matter of considerable commercial importance.

My invention further relates to arrangements and combinations of parts which will be hereinafter described and more particularly pointed out in the appended claims.

A preferred form of my invention is shown in the drawings in which—

Fig. 1 is a plan view of my improved fruit box press;

Fig. 2 is a front elevation thereof;

Fig. 3 is an enlarged sectional front elevation;

Fig. 4 is an enlarged sectional side elevation;

Fig. 5 is a detail sectional plan view, taken along the line 5—5 in Fig. 2;

Fig. 6 is a detail front elevation, looking in the direction of the arrow 6 in Fig. 1;

Fig. 7 is a side elevation of the parts shown in Fig. 6; and

Figs. 8 and 9 are partial sectional front elevations illustrating the operation of the machine.

Referring to the drawings, my improved fruit box press comprises a fixed frame having grooved upright corner posts 10, bottom frame members 11 (Figs. 3 and 4), braces 12 and intermediate cross bars 13. A pair of rectangular lifting members 14 are mounted to slide vertically in the grooves of the posts 10. These members 14 are connected by hinges 15, to a block 16, by which the members 14 are held in spaced relation.

A foot lever 17 is mounted to swing upon a pivot rod 18, positioned in any one of a series of notches 19 (Fig. 5) in the cross bars 13. The inner end of the lever underlies the block 16 and may be loosely attached thereto by a bolt or screw 20. A plate 21 fixed to the lever 17 is adapted to engage the teeth in a ratchet plate 22 (Fig. 2) secured to the fixed frame of the press.

As the foot lever 17 is pressed downward, the members 14 are raised and may be held in raised position by the ratchet plate 22. The leverage may be changed to vary the range of movement of the members 14 by placing the pivot rod 18 in different notches or openings 19. A spring 23 (Fig. 5) acts to pull the lever 17 sideways to engage the ratchet plate 22.

Cross pieces 25 (Figs. 3 and 4) connect the inner sides of the upper ends of the posts 10, and frame members 26 resting thereon provide bearings for a series of conveyor rolls 27. A guide strip 26ª positions the boxes on the rolls.

A box holding frame is provided for the press, said frame being pivoted at 30 (Fig. 4) to the rear of the fixed frame or support and comprising two side members, each formed of three parts 31, 32 and 33. These parts are secured together by bolts 34 and are provided with a series of holes so that the vertical adjustment of the upper or middle part 32 of each side member may be varied to suit boxes of different size. Brace rods 34ª connect the two side members.

Each part 33 is provided at its lower end with a lip or projection 35 (Fig. 7) adapted to catch beneath a plate 36, secured in the front side of the machine frame. Guide plates 37 are also secured to the frame to direct the swinging frame members to position for engagement with the plates 36.

When it is desired to move the holding members from operative position, the members 33 may be pulled forward by means of a tie rod or handle 38 connecting the same, and the entire frame may then be swung upward and rearward upon its pivots 30 until the off-set projections 39 (Fig. 4) engage the frame and act as stops to retain the holding frame in raised or inoperative position.

Additional conveyor frame members 40 (Figs. 1 and 2) may be detachably secured to brackets 41 at the sides of the press, the outer ends thereof being supported upon legs or braces 42. The supplementary frames are provided with rolls 43 held in substantial alignment with the conveyor rolls 27 of the main frame.

Having described the details of construction of my improved press, the method of operation thereof is as follows:

The fruit boxes are initially closed on one face, preferably by securing cover slats 44 (Fig. 4) to the ends of the box. The box is then inverted and packed so that the fruit projects slightly above the upper edge of the box, as indicated at B in Fig. 2, and the box B is then placed on the conveyor rolls 43 and is pushed under the holding frame members 32.

Pressure is then applied to the foot lever 17, raising the lifting members 14, which engage the lower face of the box at its extreme ends and raise the box off of the rolls 27, moving it from the position shown in Fig. 8 to that shown in Fig. 9.

As both the elevating members 14 and the holding frames 32 engage the opposite faces 44 and 45 of the box near their extreme ends, these parts are permitted to spring outward between their ends and the fruit is yieldingly engaged, as indicated in Fig. 9.

The flexible bottom 45 is then secured to the box ends, and the lever 17 is released from its ratchet. The box is then lowered onto the rolls 27 on which it may be moved to the position indicated at B′ at Fig. 2.

It is thus unnecessary to lift the box either on or off of the press and the holding frame may be left in operative position during the use of the press, the boxes being merely rolled along under the holding frame as they enter and leave the press. The holding frame may, of course, be swung back out of operative position whenever this is considered desirable.

The hinge connection between the block 16 and the elevating devices 14 permits one device 14 to be raised slightly more or less than the other device when engaging a box which is not filled to uniform depth throughout its length.

I have thus provided a fruit box press which may be easily adjusted to boxes of different sizes and which may be very easily operated with a minimum expenditure of manual labor and strength. The rapidity of operation is correspondingly increased and the cost of operation reduced.

Having thus described my invention and the advantages thereof, I do not wish to be limited to the details herein disclosed otherwise than as set forth in the claims, but what I claim is:—

1. A fruit box press comprising a support for the box, holding means engaging the upper side of the box adjacent its ends, and elevating means to force the box upward against said holding means, said elevating means comprising a foot lever and means to adjust the fulcrum of said lever whereby the action of the lever may be varied.

2. A fruit box press comprising a support for the box, holding means engaging the upper side of the box adjacent its ends, and elevating means to force the box upward against said holding means, said holding means being vertically adjustable to receive boxes of different heights.

3. A fruit box press comprising a support for the box, holding means engaging the upper side of the box adjacent its ends, and elevating means to force the box upward against said holding means, said holding means being pivoted at the back of the press and being detachably secured at the front of the press and being movable upward and rearward to inoperative position when detached.

4. A fruit box press comprising a frame, a plurality of box-conveying rolls mounted in said frame, holding means positioned to engage the edges of the upper side of a box elevated above said rolls, and means effective to engage said box as it rests on said conveyor rolls and to elevate the box from said rolls and to press the box against said holding means.

5. A fruit box press comprising a box support, box-holding means, elevating and retaining means for said box, frames attached to said support at each side thereof, and a plurality of box-conveying rolls in said support and in said conveying frames, all of said rolls being substantially in horizontal alignment and said elevating and retaining means being effective to raise the box above the conveyor rolls in the box support and to retain said box in raised position against said holding means.

In testimony whereof I have hereunto affixed my signature.

JOHN CHANDLER.